US011490571B1

(12) United States Patent
Miller

(10) Patent No.: US 11,490,571 B1
(45) Date of Patent: Nov. 8, 2022

(54) MODULAR PLANTER ASSEMBLY

(71) Applicant: Doug Miller, Phelpston (CA)

(72) Inventor: Doug Miller, Phelpston (CA)

(*) Notice: Subject to any disclaimer, the term of this patent is extended or adjusted under 35 U.S.C. 154(b) by 113 days.

(21) Appl. No.: 17/114,653

(22) Filed: Dec. 8, 2020

(51) Int. Cl.
A01G 9/02 (2018.01)

(52) U.S. Cl.
CPC .................. A01G 9/023 (2013.01)

(58) Field of Classification Search
CPC .......... A01G 9/00; A01G 9/023; A01G 9/022; A01G 9/02; A47G 7/00; A47F 5/02; A47F 5/04; A47F 5/05; A47F 5/0018; A47F 5/0037; A47F 5/0025; A47F 5/06
USPC ........ 211/53, 56, 58, 77, 78, 95, 115, 129.1, 211/131.1, 144, 163, 85.23
See application file for complete search history.

(56) References Cited

U.S. PATENT DOCUMENTS

| 3,030,735 | A | | 4/1962 | Bodkins | |
|---|---|---|---|---|---|
| 4,250,666 | A | * | 2/1981 | Rakestraw | A01G 9/02 47/83 |
| 4,380,136 | A | | 4/1983 | Karpisek | |
| 4,971,234 | A | * | 11/1990 | Hay | B60R 11/06 224/42.32 |
| D312,983 | S | | 12/1990 | Powell | |
| 5,052,148 | A | | 10/1991 | Sharon | |
| 9,320,206 | B2 | | 4/2016 | Ganske | |
| 9,603,469 | B2 | | 3/2017 | LaPointe | |
| 2011/0100940 | A1 | * | 5/2011 | Liao | F16M 11/02 211/133.1 |
| 2013/0185997 | A1 | * | 7/2013 | Trofe | A01G 9/24 |
| 2017/0251642 | A1 | * | 9/2017 | Capodice | A01K 63/00 |

FOREIGN PATENT DOCUMENTS

WO 2015173798 11/2015

* cited by examiner

Primary Examiner — Joshua J Michener
Assistant Examiner — Henry Hooper Mudd
(74) Attorney, Agent, or Firm — Kyle A. Fletcher, Esq.

(57) ABSTRACT

The modular planter assembly incorporates a pedestal structure, a stanchion structure, and a plurality of planting trays. The pedestal structure and the stanchion structure elevate each of the plurality of planting trays such that elevation of any initial planting tray selected from the plurality of planting trays differs from the elevation of any subsequent planting tray selected from the plurality of planting trays. The modular planter assembly is a modular structure. By modular structure is meant that: a) any initially selected planting tray can be substituted for any subsequently selected planting tray; and, b) the number of planting trays contained in the plurality of planting trays is adjustable. The modular planter assembly is a rotating structure. By rotating structure is meant that the cant between the center axis of any initially selected planting tray and the center axis of any subsequently selected planting tray is adjustable.

18 Claims, 5 Drawing Sheets

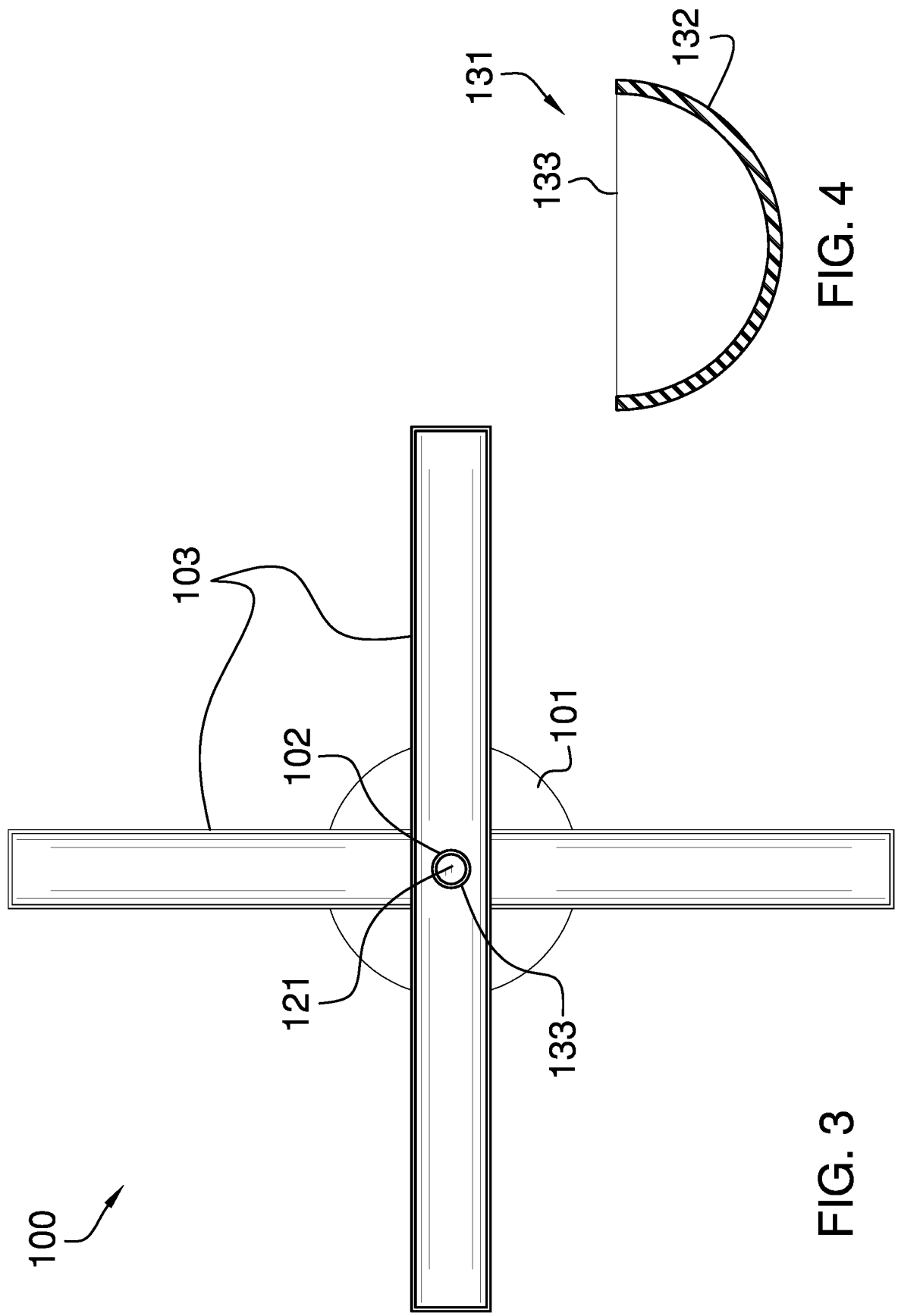

MODULAR PLANTER ASSEMBLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of horticulture including cultivation in receptacles, more specifically, a multitier planter. (A01G9/023)

SUMMARY OF INVENTION

The modular planter assembly is configured for use in horticulture. The modular planter assembly comprises a pedestal structure, a stanchion structure, and a plurality of planting trays. The pedestal structure and the stanchion structure elevate each of the plurality of planting trays such that elevation of any initial planting tray selected from the plurality of planting trays differs from the elevation of any subsequent planting tray selected from the plurality of planting trays. The modular planter assembly is a modular structure. By modular structure is meant that: a) any initial planting tray selected from the plurality of planting trays can be substituted for any subsequent planting tray selected from the plurality of planting trays; and, b) the number of planting trays contained in the plurality of planting trays is adjustable. The modular planter assembly is a rotating structure. By rotating structure is meant that the cant between the center axis of any initial planting tray selected from the plurality of planting trays and the center axis of any subsequent planting tray selected from the plurality of planting trays is adjustable.

These together with additional objects, features and advantages of the modular planter assembly will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular planter assembly in detail, it is to be understood that the modular planter assembly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular planter assembly.

It is therefore important that the claims be regarded as including such equivalent construction insofar as they do not depart from the spirit and scope of the modular planter assembly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a top view of an embodiment of the disclosure.

FIG. 4 is a cross-sectional view of an embodiment of the disclosure across line 4-4 in FIG. 2.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
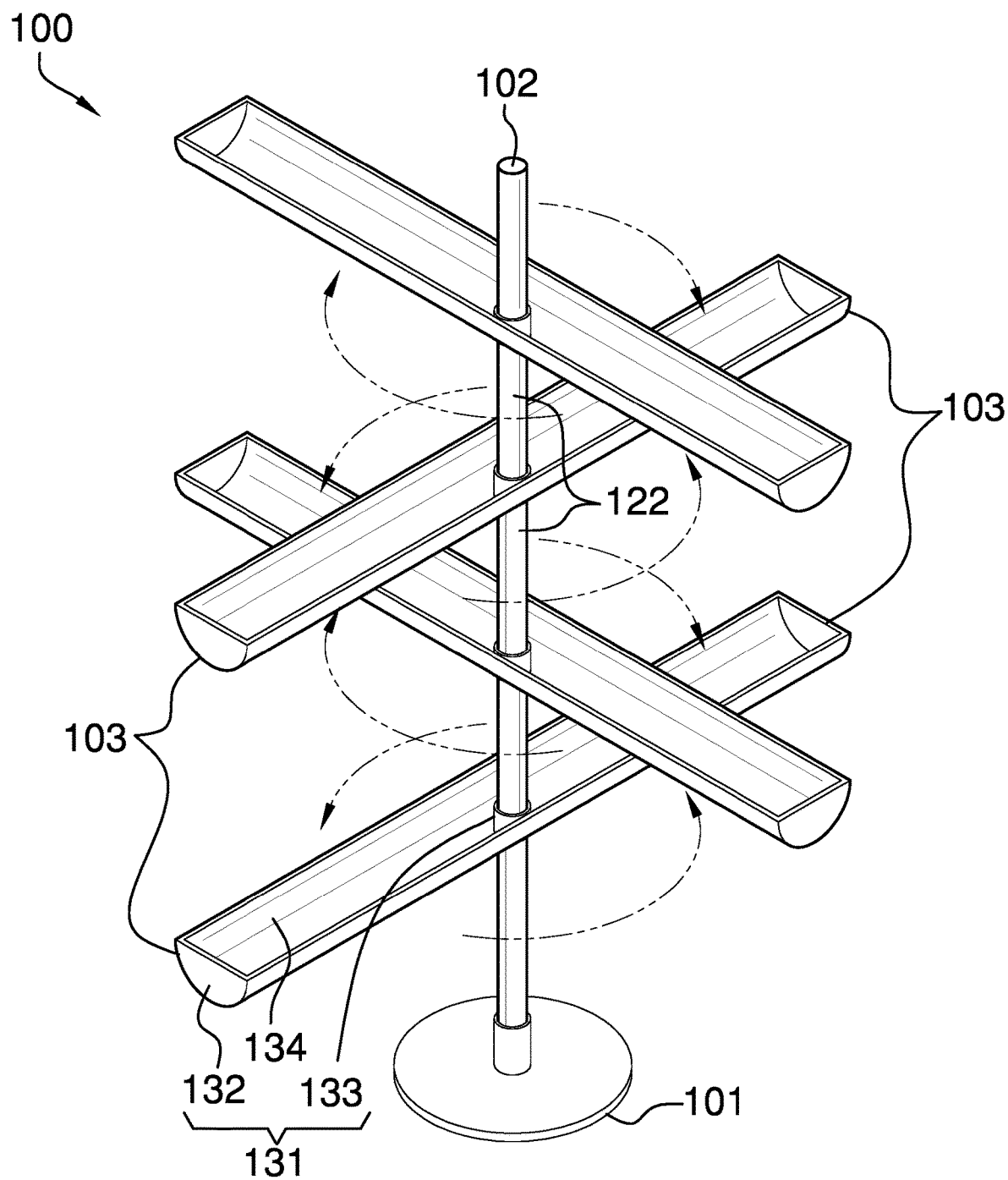
FIG. 1 is a perspective view of an embodiment of the disclosure.
Figure 2:
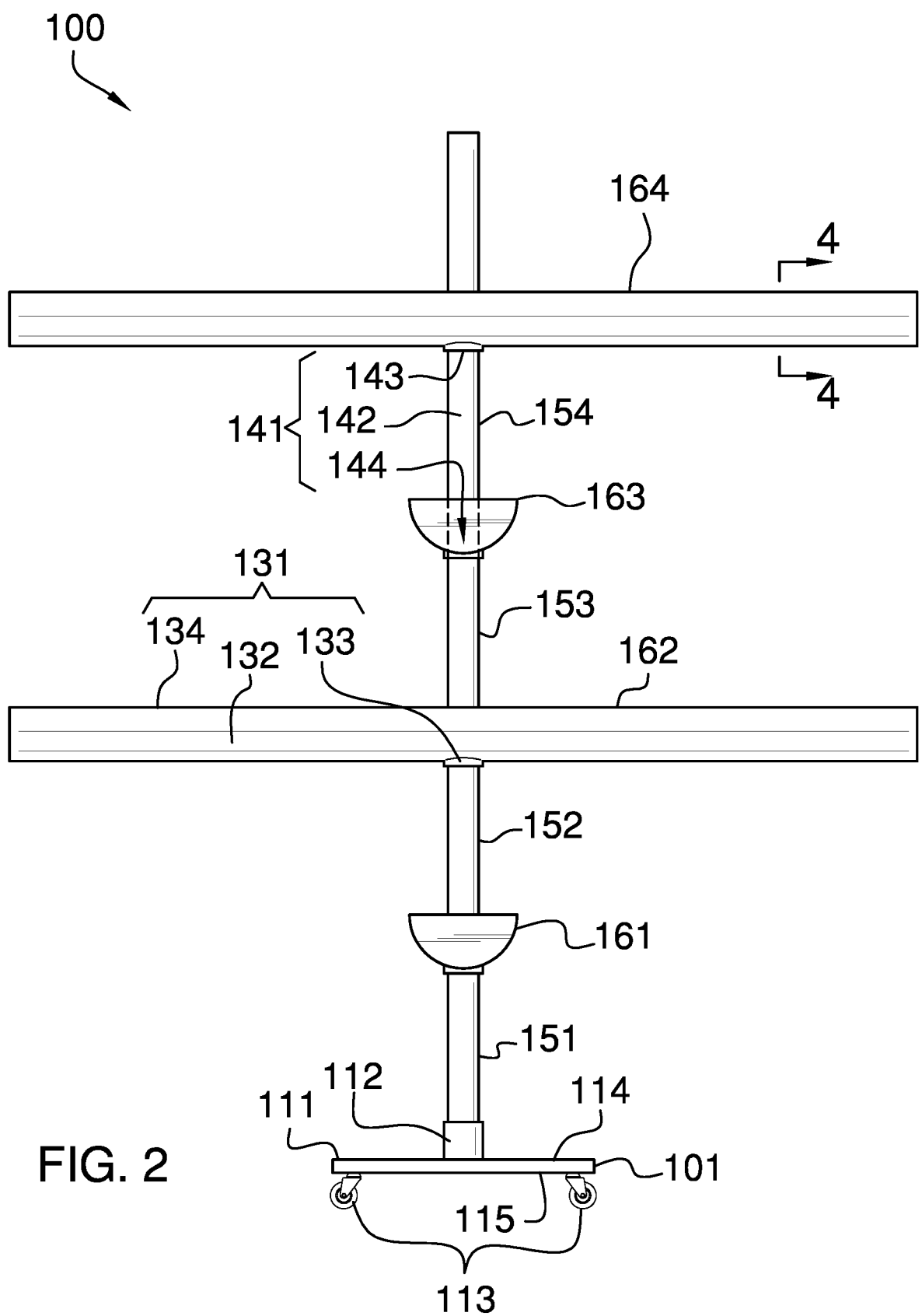
FIG. 2 is a side view of an embodiment of the disclosure.
Figure 5:
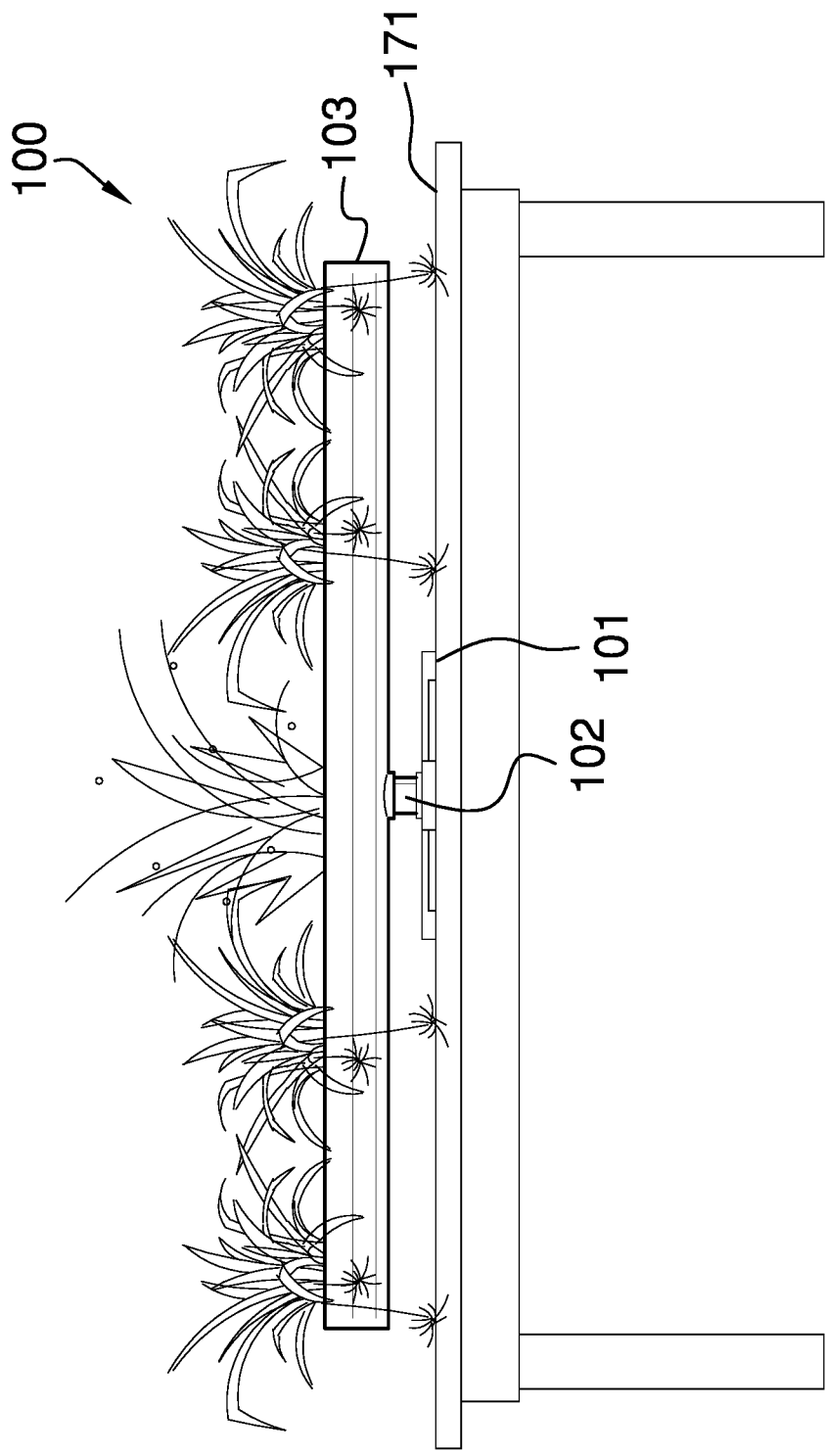
FIG. 5 is a side view of an embodiment of the disclosure on a table.
Figure 6:
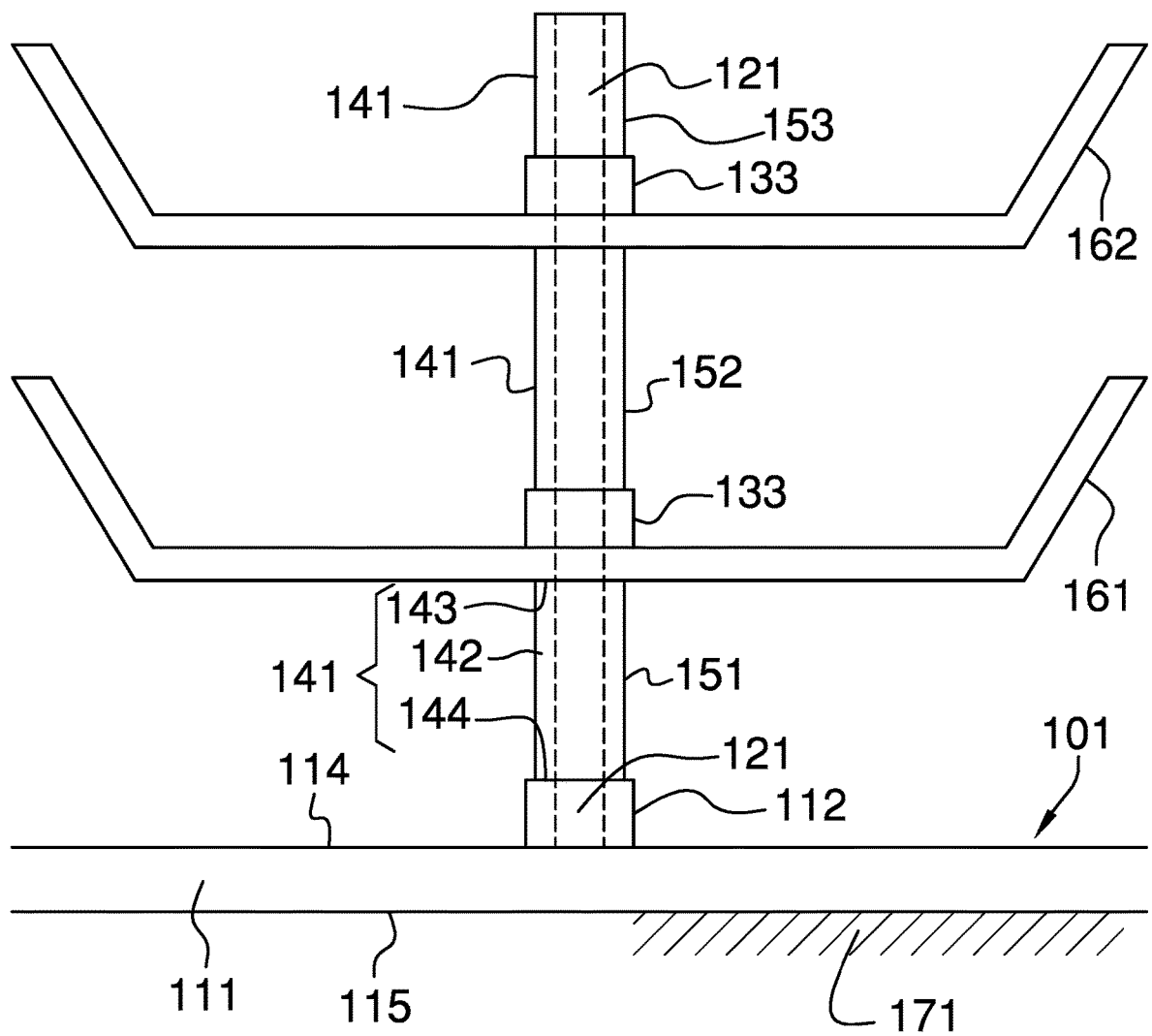
FIG. 6 is a detailed view of an embodiment of the disclosure.

Detailed reference will now be made to one or more potential embodiments of the disclosure, which are illustrated in FIGS. 1 through 6.

The modular planter assembly 100 (hereinafter invention) is configured for use in horticulture. The invention 100 comprises a pedestal structure 101, a stanchion structure 102, and a plurality of planting trays 103. The pedestal structure 101 and the stanchion structure 102 elevate each of the plurality of planting trays 103 such that elevation of any initial individual planting tray 131 selected from the plurality of planting trays 103 differs from the elevation of any subsequent individual planting tray 131 selected from the plurality of planting trays 103. The invention 100 is a modular structure. By modular structure is meant that: a) any initial individual planting tray 131 selected from the plurality of planting tray 103 can be substituted for any subsequent individual planting tray 131 selected from the plurality of planting trays 103; and, b) the number of individual planting trays 131 contained in the plurality of planting trays 103 is adjustable. The invention 100 is a rotating structure. By rotating structure is meant that the cant between the center axis of any initial individual planting tray 131 selected from the plurality of planting trays 103 and the center axis of any subsequent individual planting tray 131 selected from the plurality of planting trays 103 is adjustable.

The pedestal structure 101 forms the inferior structure of the invention 100. The pedestal structure 101 transfers the loads borne by the stanchion structure 102 and the plurality of planting trays 103 to a supporting surface 171. The pedestal structure 101 comprises a pedestal disk 111 and a pedestal flange 112.

The pedestal disk 111 is a rigid structure. The pedestal disk 111 is a prism-shaped structure. The pedestal disk 111 is shaped as a disk. The pedestal disk 111 forms the inferior structure of the invention 100. The pedestal disk 111 forms the final link of the load path that transfers the loads of the stanchion structure 102 and the plurality of planting trays 103 to the supporting surface 171. The pedestal disk 111 further comprises a superior face 114 and an inferior face 115. The inferior face 115 is the face of the disk structure of the pedestal disk 111 that is proximal to the supporting surface 171. The superior face 114 is the face of the disk structure of the pedestal disk 111 that is distal from the inferior face 115.

The pedestal flange 112 is a fastening structure that secures the stanchion structure 102 to the pedestal disk 111. The pedestal flange 112 is a rigid structure. The pedestal flange 112 is a hollow prism-shaped structure. The pedestal flange 112 has a tubular shape. The pedestal flange 112 attaches to the pedestal disk 111 to form a composite prism structure. Specifically, the pedestal flange 112 attaches to the superior face 114 of the pedestal disk 111 such that the center axis of the prism structure of the pedestal flange 112 aligns with the center axis of the disk structure of the pedestal disk 111. The hollow interior of the pedestal flange 112 is geometrically similar to the stanchion structure 102. The pedestal flange 112 is sized to allow the stanchion structure 102 to insert into the hollow interior of the tubular structure of the pedestal flange 112. The stanchion structure 102 attaches to the pedestal structure 101 by inserting into the pedestal flange 112.

In a second potential embodiment of the disclosure, the pedestal structure 101 further comprises a plurality of locking casters 113. Each of the plurality of locking casters 113 is a rolling structure. Each of the plurality of locking casters 113 attaches to the inferior face 115 of the pedestal disk 111 such that the pedestal structure 101 will roll the invention 100 over the supporting surface 171. The plurality of locking casters 113 has a locking structure that locks one or more casters selected from the plurality of locking casters 113 into a fixed position such that the invention 100 will not roll over the supporting surface 171.

The stanchion structure 102 is a load bearing structure. The stanchion structure 102 is a vertically oriented composite prism structure. The plurality of planting trays 103 is incorporated into the composite prism structure formed by the stanchion structure 102. The stanchion structure 102 elevates each of the plurality of planting trays 103 above the pedestal structure 101. The stanchion structure 102 transfers the loads borne by the plurality of planting trays 103 to the pedestal structure 101. The stanchion structure 102 is a modular structure such that the stanchion structure 102 can accommodate changes to the number of individual planting trays 131 contained in the plurality of planting trays 103.

The stanchion structure 102 elevates each of the plurality of planting trays 103 such that each of the plurality of planting trays 103 are independently rotatable. By independently rotatable is meant that each individual planting tray 131 can be rotated such that the cant between: a) any initial individual planting tray 131 selected from the plurality of planting trays 103; and, b) any subsequent individual planting tray 131 selected from the plurality of planting trays 103 is adjustable. The ability to rotate each of the individual planting tray 131 selected from the plurality of planting trays 103 allows the exposure to the sun for each individual planting tray 131 to be adjusted and optimized.

The stanchion structure 102 further comprises an alignment stanchion 121 and a plurality of load bearing modules 122.

The alignment stanchion 121 is a rigid structure. The alignment stanchion 121 is a prism-shaped structure. The alignment stanchion 121 forms the structure that attaches the stanchion structure 102 to the pedestal structure 101. The prism structure of the alignment stanchion 121 is geometrically similar to the prism structure of the pedestal flange 112 such that the alignment stanchion 121 inserts into the pedestal flange 112. The alignment stanchion 121 inserts into the pedestal flange 112 to form a composite prism structure. The alignment stanchion 121 inserts through each of the plurality of load bearing modules 122 to form a composite prism structure. The alignment stanchion 121 inserts through each of the plurality of planting trays 103 such that the plurality of planting trays 103 are incorporated into the composite prism structure formed by the combination of the alignment stanchion 121 and the plurality of load bearing modules 122. The alignment stanchion 121 forms the structure that aligns the pedestal flange 112, the plurality of load bearing modules 122, and the plurality of planting trays 103 into the composite prism structure.

Each of the plurality of load bearing modules 122 is a rigid structure. Each of the plurality of load bearing modules 122 is a hollow prism-shaped structure. Each of the plurality of load bearing modules 122 has a tubular shape. Each of the plurality of load bearing modules 122 forms a load bearing structure. The plurality of load bearing modules 122 comprises a collection of individual load bearing modules 141.

Each individual load bearing module 141 has an elevation above the supporting surface 171. Each individual load bearing module 141 selected from the plurality of load bearing modules 122 receives the loads formed by: a) each element of the plurality of load bearing modules 122 with a greater elevation than the selected individual load bearing module 141; and, b) each individual planting tray 131 selected from the plurality of load bearing modules 122 with a greater elevation than the selected individual load bearing module 141.

Each selected individual load bearing module 141 transfers the received load to the individual planting tray 131 directly inferior to the selected individual load bearing module 141. Each of the individual load bearing modules 141 thereby form a load bearing chain that forms the load path that transfers the loads of each of the plurality of planting trays 103 to the pedestal structure 101.

Each individual load bearing module 141 selected from the stanchion structure 102 is a tubular structure. Each individual load bearing module 141 forms a load path selected from the group consisting of: a) the load path from an individual planting tray 131 initially selected from the plurality of planting trays 103 to an individual planting tray 131 selected from the plurality of planting trays 103 that has an elevation less than the initially selected individual planting tray 131; and, b) the load path from the first planting tray 161 of the plurality of planting trays 103 to the pedestal structure 101. Each individual load bearing module 141 further comprises a load bearing tube 142.

The load bearing tube 142 is a rigid structure. The load bearing tube 142 is a prism-shaped structure. The load bearing tube 142 has a tubular shape. The load bearing tube 142 forms a portion of the load bearing structure of the stanchion structure 102. The load bearing tube 142 further comprises a superior end 143 and an inferior end 144. The superior end 143 is the congruent end of the prism structure of the individual load bearing module 141 that is distal from the pedestal structure 101. The inferior end 144 is the congruent end of the prism structure of the individual load bearing module 141 that is distal from the superior end 143.

In the first potential embodiment of the disclosure, the stanchion structure 102 comprises a first load bearing module 151, a second load bearing module 152, a third load bearing module 153, and a fourth load bearing module 154.

The first load bearing module 151 is the load bearing module selected from the stanchion structure 102 that transfers the load of the first planting tray 161 to the pedestal structure 101. The first load bearing module 151 is the individual load bearing module 141 that inserts into the pedestal flange 112 of the pedestal structure 101. The second load bearing module 152 is the load bearing module selected from the stanchion structure 102 that transfers the load of the second planting tray 162 to the first planting tray 161. The third load bearing module 153 is the load bearing module selected from the stanchion structure 102 that transfers the load of the third planting tray 163 to the second planting tray 162. The fourth load bearing module 154 is the load bearing module selected from the stanchion structure 102 that transfers the load of the fourth planting tray 164 to the third planting tray 163.

Each of the plurality of planting trays 103 is a containment structure used for growing one or more plants. Each of the plurality of planting trays 103 contains the one or more plants. The primary shape of each of the plurality of planting trays 103 is pan structure. The primary shape of each of the plurality of planting trays 103 has a prism shape. Each of the plurality of planting trays 103 attaches to the stanchion structure 102 such that each of the plurality of planting trays 103 are independently rotatable. By independently rotatable is meant that each individual planting tray 131 can be rotated such that the cant between: a) any initial individual planting tray 131 selected from the plurality of planting trays 103; and, b) any subsequent individual planting tray 131 selected from the plurality of planting trays 103 is adjustable. The plurality of planting trays 103 comprises a collection of individual planting trays 131.

Each individual planting tray 131 forms a containment structure used for growing one or more plants. Each individual planting tray 131 attaches to the stanchion structure 102 such that the elevation of any initially selected individual planting tray 131 differs from the elevation of any subsequently selected individual planting tray 131. Each individual planting tray 131 rotates around an axis of rotation aligned with the center axis of the alignment stanchion 121 of the stanchion structure 102. Each individual planting tray 131 further comprises a planting pan 132 and a radial channel 133.

The planting pan 132 is a prism-shaped structure. The planting pan 132 has a pan shape. The planting pan 132 has the shape of a prismatic bifurcation. The prismatic bifurcation of the planting pan 132 is formed as a horizontal segment. The planting pan 132 forms the containment structure used for growing one or more plants. The planting pan 132 attaches to the stanchion structure 102 such that the center axis of the prism structure of the planting pan 132 is horizontally oriented. The planting pan 132 further comprises an open face 134. The open face 134 is the open face 134 of the pan structure of the planting pan 132. The planting pan 132 attaches to the stanchion structure 102 such that the open face 134 forms the superior structure of the pan structure of the planting pan 132.

The radial channel 133 is a tubular structure. The radial channel 133 is formed through the lateral face of the prismatic bifurcation that forms the planting pan 132. The radial channel 133 is geometrically similar to the alignment stanchion 121 of the stanchion structure 102. The span of the length of the inner dimension of the radial channel 133 is greater than the outer dimension of the alignment stanchion 121 such that the alignment stanchion 121 inserts through the radial channel 133 to form a composite prism structure.

The radial channel 133 is positioned on the lateral face of the planting pan 132 such that the center axis that is located on the radial channel 133 intersects with the center of the center axis of formed in the bifurcating plane of the bifurcated prism structure of the planting pan 132. The radial channel 133 is positioned on the lateral face of the planting pan 132 such that the radial channel 133 forms the inferior structure of the individual planting tray 131.

In the first potential embodiment of the disclosure, the plurality of planting trays 103 comprises a first planting tray 161, a second planting tray 162, a third planting tray 163, and a fourth planting tray 164.

The first planting tray 161 is the individual planting tray 131 selected from the plurality of planting trays 103 with the lowest elevation. The fourth planting tray 164 is the individual planting tray 131 selected from the plurality of planting trays 103 with the greatest elevation. The second planting tray 162 is the individual planting tray 131 selected from the plurality of planting trays 103 with an elevation between the elevation of the first planting tray 161 and the elevation of the third planting tray 163. The third planting tray 163 is the individual planting tray 131 selected from the plurality of planting trays 103 with an elevation between the elevation of the second planting tray 162 and the elevation of the fourth planting tray 164.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Flange: As used in this disclosure, a flange is a protruding rib, edge, or collar that is used to hold an object in place or to attach a first object to a second object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Horizontal Segment: As used in this disclosure, a horizontal segment refers to a prism or cylinder that is bifurcated by a single plane that is parallel to or contains the center axis of the prism or cylinder.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Modular: As used in this disclosure, modular refers to a system of assembly of a structure from modules.

Module: As used in this disclosure, a module refers to an independent subunit of a larger structure. Modules are often interchangeable in a manner that allows the form factor or function of the larger structure to be customized.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prismatic Bifurcation: As used in this disclosure, a prismatic bifurcation refers to the bifurcation of a prism structure by a plane wherein the bifurcating plane does not intersect the center axis of the prism structure. In a prismatic bifurcation, the center axis can lie on the bifurcating plane. In this instance, the prismatic bifurcation is said to form a horizontal segment.

Radial: As used in this disclosure, the term radial refers to a direction that: 1) is perpendicular to an identified central axis; or, 2) projects away from a center point.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Semi-Enclosed Prism: As used in this disclosure, a semi-enclosed prism is a prism-shaped structure wherein a portion of the lateral face of the prism-shaped is removed or otherwise replaced with a negative space.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Stanchion: As used in this disclosure, a stanchion refers to a vertically oriented prism-shaped pole, post, or support.

Swivel: As used in this disclosure, a swivel is a fastening structure that attaches a first object to a second object such that will rotate around an axis of rotation while the second object remains in a fixed position relative to the first object.

Trough: As used in this disclosure, a trough refers to containment structure that is formed as a prismatic bifurcation.

Tube: As used in this disclosure, the term tube is used to describe a rigid hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A modular planter assembly comprising
a pedestal structure, a stanchion structure, and a plurality of planting trays;
wherein the pedestal structure and the stanchion structure elevate each of the plurality of planting trays such that elevation of any initial individual planting tray selected from the plurality of planting trays differs from the elevation of any subsequent individual planting tray selected from the plurality of planting trays;
wherein the modular planter assembly is configured for use in horticulture;
wherein the pedestal structure comprises a pedestal disk and a pedestal flange;
wherein the pedestal flange attaches to the pedestal disk;
wherein the pedestal flange attaches the stanchion structure to the pedestal disk;
wherein the stanchion structure further comprises an alignment stanchion and a plurality of load bearing modules;
wherein the alignment stanchion inserts into the pedestal flange to form a composite structure;
wherein the alignment stanchion inserts through each of the plurality of load bearing modules to form a composite structure.

2. The modular planter assembly according to claim 1
wherein the modular planter assembly is a modular structure;
wherein by modular structure is meant that: a) any initial individual planting tray selected from the plurality of planting tray can be substituted for any subsequent individual planting tray selected from the plurality of planting trays; and, b) the number of individual planting trays contained in the plurality of planting trays is adjustable;
wherein the modular planter assembly is a rotating structure;
wherein by rotating structure is meant that the cant between the center axis of any initial individual planting tray selected from the plurality of planting trays and the center axis of any subsequent individual planting tray selected from the plurality of planting trays is adjustable.

3. The modular planter assembly according to claim 2
wherein the pedestal structure forms the inferior structure of the modular planter assembly;
wherein the pedestal structure transfers the loads borne by the stanchion structure and the plurality of planting trays to a supporting surface.

4. The modular planter assembly according to claim 3
wherein the stanchion structure is a load bearing structure;
wherein the stanchion structure is a vertically oriented composite structure;
wherein the plurality of planting trays is incorporated into the composite structure formed by the stanchion structure;
wherein the stanchion structure elevates each of the plurality of planting trays above the pedestal structure;
wherein the stanchion structure transfers the loads borne by the plurality of planting trays to the pedestal structure.

5. The modular planter assembly according to claim 4
wherein the stanchion structure is a modular structure such that the stanchion structure can accommodate changes to the number of individual planting trays contained in the plurality of planting trays;
wherein the stanchion structure elevates each of the plurality of planting trays such that each of the plurality of planting trays are independently rotatable;
wherein by independently rotatable is meant that each individual planting tray can be rotated such that the cant between: a) any initial individual planting tray selected from the plurality of planting trays; and, b) any subsequent individual planting tray selected from the plurality of planting trays is adjustable.

6. The modular planter assembly according to claim 5
wherein each of the plurality of planting trays is a containment structure used for growing one or more plants;
wherein each of the plurality of planting trays contains the one or more plants;
wherein the primary shape of each of the plurality of planting trays is a pan structure;
wherein each of the plurality of planting trays attaches to the stanchion structure such that each of the plurality of planting trays are independently rotatable;
wherein by independently rotatable is meant that each individual planting tray can be rotated such that the cant between: a) any initial individual planting tray selected from the plurality of planting trays; and, b) any subsequent individual planting tray selected from the plurality of planting trays is adjustable;
wherein the plurality of planting trays comprises a collection of individual planting trays.

7. The modular planter assembly according to claim 6
wherein the pedestal disk is a rigid structure;
wherein the pedestal disk is shaped as a disk;
wherein the pedestal disk forms the inferior structure of the modular planter assembly;
wherein the pedestal disk forms the final link of the load path that transfers the loads of the stanchion structure and the plurality of planting trays to the supporting surface;
wherein the pedestal disk further comprises a superior face and an inferior face;
wherein the inferior face is the face of the disk structure of the pedestal disk that is proximal to the supporting surface;
wherein the superior face is the face of the disk structure of the pedestal disk that is distal from the inferior face.

8. The modular planter assembly according to claim 7
wherein the pedestal flange is a fastening structure that secures the stanchion structure to the pedestal disk;
wherein the pedestal flange is a rigid structure;
wherein the pedestal flange is a hollow structure;
wherein the pedestal flange has a tubular shape;
wherein the pedestal flange attaches to the pedestal disk to form a composite structure;
wherein the pedestal flange attaches to the superior face of the pedestal disk such that the center axis of the pedestal flange aligns with the center axis of the disk structure of the pedestal disk;
wherein the hollow interior of the pedestal flange is geometrically similar to the stanchion structure;
wherein the pedestal flange is sized to allow the stanchion structure to insert into the hollow interior of the tubular structure of the pedestal flange;
wherein the stanchion structure attaches to the pedestal structure by inserting into the pedestal flange.

9. The modular planter assembly according to claim 8
wherein the alignment stanchion is a rigid structure;
wherein the alignment stanchion forms the structure that attaches the stanchion structure to the pedestal structure;
wherein the structure of the alignment stanchion is geometrically similar to the structure of the pedestal flange such that the alignment stanchion inserts into the pedestal flange;
wherein the alignment stanchion inserts through each of the plurality of planting trays such that the plurality of planting trays are incorporated into the composite structure formed by the combination of the alignment stanchion and the plurality of load bearing modules;
wherein the alignment stanchion forms the structure that aligns the pedestal flange, the plurality of load bearing modules, and the plurality of planting trays into the composite structure.

10. The modular planter assembly according to claim 9
wherein each of the plurality of load bearing modules is a rigid structure;
wherein each of the plurality of load bearing modules is a hollow structure;
wherein each of the plurality of load bearing modules has a tubular shape;
wherein each of the plurality of load bearing modules forms a load bearing structure;
wherein the plurality of load bearing modules comprises a collection of individual load bearing modules;
wherein each individual load bearing module has an elevation above the supporting surface.

11. The modular planter assembly according to claim 10
wherein each individual load bearing module selected from the stanchion structure is a tubular structure;
wherein each individual load bearing module forms a load path selected from the group consisting of: a) the load path from an individual planting tray initially selected from the plurality of planting trays to an individual planting tray selected from the plurality of planting trays that has an elevation less than the initially selected individual planting tray; and, b) the load path from the first planting tray of the plurality of planting trays to the pedestal structure.

12. The modular planter assembly according to claim 11
wherein each individual load bearing module further comprises a load bearing tube;
wherein the load bearing tube is a rigid structure;
wherein the load bearing tube has a tubular shape;
wherein the load bearing tube forms a portion of the load bearing structure of the stanchion structure;
wherein the load bearing tube further comprises a superior end and an inferior end;
wherein the superior end is the congruent end of the structure of the individual load bearing module that is distal from the pedestal structure;
wherein the inferior end is the congruent end of the structure of the individual load bearing module that is distal from the superior end.

13. The modular planter assembly according to claim 12
wherein each individual planting tray forms a containment structure used for growing one or more plants;
wherein each individual planting tray attaches to the stanchion structure such that the elevation of any initially selected individual planting tray differs from the elevation of any subsequently selected individual planting tray;
wherein each individual planting tray rotates around an axis of rotation aligned with the center axis of the alignment stanchion of the stanchion structure;
wherein the plurality of planting trays comprises a collection of individual planting trays;
wherein each individual planting tray further comprises a planting pan and a radial channel;
wherein the radial channel is formed in the planting pan.

14. The modular planter assembly according to claim 13
wherein the planting pan has a pan shape;
wherein the planting pan has the shape of a prismatic bifurcation;
wherein the prismatic bifurcation of the planting pan is formed as a horizontal segment;
wherein the planting pan forms the containment structure used for growing one or more plants;
wherein the planting pan attaches to the stanchion structure such that the center axis of the planting pan is horizontally oriented;
wherein the planting pan further comprises an open face;
wherein the open face is the open face of the pan structure of the planting pan;
wherein the planting pan attaches to the stanchion structure such that the open face forms the superior structure of the pan structure of the planting pan.

15. The modular planter assembly according to claim 14
wherein the radial channel is a tubular structure;
wherein the radial channel is formed through the lateral face of the prismatic bifurcation that forms the planting pan;
wherein the radial channel is geometrically similar to the alignment stanchion of the stanchion structure;
wherein the span of the length of the inner dimension of the radial channel is greater than the outer dimension of the alignment stanchion such that the alignment stanchion inserts through the radial channel to form a composite structure;
wherein the radial channel is positioned on the lateral face of the planting pan such that the center axis that is located on the radial channel intersects with the center of the center axis formed in the bifurcating plane of the bifurcated structure of the planting pan;
wherein the radial channel is positioned on the lateral face of the planting pan such that the radial channel forms the inferior structure of the individual planting tray.

16. The modular planter assembly according to claim 15
wherein the plurality of planting trays comprises a first planting tray, a second planting tray, a third planting tray, and a fourth planting tray;
wherein the first planting tray is the individual planting tray selected from the plurality of planting trays with the lowest elevation;
wherein the fourth planting tray is the individual planting tray selected from the plurality of planting trays with the greatest elevation;
wherein the second planting tray is the individual planting tray selected from the plurality of planting trays with an elevation between the elevation of the first planting tray and the elevation of the third planting tray;
wherein the third planting tray is the individual planting tray selected from the plurality of planting trays with an elevation between the elevation of the second planting tray and the elevation of the fourth planting tray.

17. The modular planter assembly according to claim 16
wherein the stanchion structure comprises a first load bearing module, a second load bearing module, a third load bearing module, and a fourth load bearing module;

wherein the first load bearing module is the load bearing module selected from the stanchion structure that transfers the load of the first planting tray to the pedestal structure;

wherein the first load bearing module is the individual load bearing module that inserts into the pedestal flange of the pedestal structure;

wherein the second load bearing module is the load bearing module selected from the stanchion structure that transfers the load of the second planting tray to the first planting tray;

wherein the third load bearing module is the load bearing module selected from the stanchion structure that transfers the load of the third planting tray to the second planting tray;

wherein the fourth load bearing module is the load bearing module selected from the stanchion structure that transfers the load of the fourth planting tray to the third planting tray.

18. The modular planter assembly according to claim 17 wherein the pedestal structure further comprises a plurality of locking casters;

wherein each of the plurality of locking casters is a rolling structure;

wherein each of the plurality of locking casters attaches to the inferior face of the pedestal disk such that the pedestal structure will roll the modular planter assembly over the supporting surface;

wherein the plurality of locking casters has a locking structure that locks one or more casters selected from the plurality of locking casters into a fixed position such that the modular planter assembly will not roll over the supporting surface.

* * * * *